(12) United States Patent
Won et al.

(10) Patent No.: US 9,111,506 B2
(45) Date of Patent: Aug. 18, 2015

(54) DISPLAY DEVICE HAVING A GATE DRIVER RESPONSIVE TO MULTIPLE SCAN START SIGNALS

(75) Inventors: Myung-Ho Won, Seoul (KR); Min-Sik Um, Jeonju-si (KR); Seong-Il Kim, Asan-si (KR); Sang-Won Lee, Asan-si (KR); Tae-Seok Ha, Daejeon (KR); Hyo-Sun Kim, Asan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 664 days.

(21) Appl. No.: 13/208,531

(22) Filed: Aug. 12, 2011

(65) Prior Publication Data

US 2012/0249518 A1 Oct. 4, 2012

(30) Foreign Application Priority Data

Mar. 28, 2011 (KR) ........................ 10-2011-0027610

(51) Int. Cl.
*G09G 3/36* (2006.01)
*H04N 13/04* (2006.01)

(52) U.S. Cl.
CPC ......... *G09G 3/3674* (2013.01); *H04N 13/0438* (2013.01); *H04N 13/0452* (2013.01); *G09G 2310/0267* (2013.01); *G09G 2310/0286* (2013.01); *G09G 2310/061* (2013.01); *G09G 2310/08* (2013.01); *G09G 2320/0209* (2013.01)

(58) Field of Classification Search
CPC ..................... G09G 3/3674; G09G 2310/062
See application file for complete search history.

(56) References Cited

U.S. PATENT DOCUMENTS

| | | | |
|---|---|---|---|
| 5,298,913 A | 3/1994 | Numao et al. | |
| 5,850,269 A | 12/1998 | Kim | |
| 5,867,141 A * | 2/1999 | Asada et al. | 345/100 |
| 6,081,250 A | 6/2000 | Shimada et al. | |
| 6,473,077 B1 * | 10/2002 | Takenaka et al. | 345/209 |
| 6,590,553 B1 | 7/2003 | Kimura et al. | |
| 7,593,069 B2 | 9/2009 | Oh et al. | |
| 2001/0003448 A1 * | 6/2001 | Nose et al. | 345/99 |
| 2003/0001983 A1 * | 1/2003 | Nose | 349/61 |
| 2003/0090449 A1 * | 5/2003 | Arimoto et al. | 345/87 |
| 2003/0227433 A1 * | 12/2003 | Moon | 345/100 |
| 2004/0150610 A1 * | 8/2004 | Zebedee et al. | 345/100 |
| 2004/0217931 A1 * | 11/2004 | Shin | 345/90 |
| 2004/0217935 A1 * | 11/2004 | Jeon et al. | 345/100 |

(Continued)

FOREIGN PATENT DOCUMENTS

| | | |
|---|---|---|
| JP | 08-006526 | 1/1996 |
| JP | 2003-084716 | 3/2003 |

(Continued)

*Primary Examiner* — Claire X Pappas
*Assistant Examiner* — Robert Stone
(74) *Attorney, Agent, or Firm* — F. Chau & Associates, LLC

(57) ABSTRACT

A display device includes a plurality of pixels arranged in matrix, a plurality of gate lines, a plurality of data lines, and a gate driver connected to the plurality of gate lines. The gate driver receives a first scan start signal, a second scan start signal and clock signals and outputs a gate-on voltage to each of the plurality of gate lines. The gate driver outputs the gate-on voltage to the plurality of gate lines such that the gate-on voltages do not overlap with each other when the gate driver receives the first scan start signal. The gate driver outputs the gate-on voltage to at least two of the gate lines at substantially the same time when the gate driver receives the second scan start signal.

10 Claims, 9 Drawing Sheets

(56) References Cited

U.S. PATENT DOCUMENTS

| | | | |
|---|---|---|---|
| 2005/0275614 A1* | 12/2005 | Kim et al. | 345/100 |
| 2006/0007085 A1* | 1/2006 | Kim et al. | 345/87 |
| 2006/0033696 A1* | 2/2006 | Nakamura et al. | 345/100 |
| 2006/0125715 A1* | 6/2006 | Choi | 345/14 |
| 2007/0001991 A1* | 1/2007 | Jang et al. | 345/100 |
| 2007/0075954 A1* | 4/2007 | Oh et al. | 345/92 |
| 2007/0194319 A1* | 8/2007 | An et al. | 257/72 |
| 2007/0247932 A1* | 10/2007 | Tobita | 365/189.12 |
| 2007/0290977 A1 | 12/2007 | Cheng et al. | |
| 2008/0191980 A1* | 8/2008 | Jeon | 345/87 |
| 2008/0278467 A1* | 11/2008 | Hwang et al. | 345/205 |
| 2010/0013755 A1 | 1/2010 | Chiou et al. | |
| 2010/0097366 A1* | 4/2010 | Kitayama et al. | 345/213 |
| 2010/0201666 A1* | 8/2010 | Tobita | 345/208 |
| 2011/0050748 A1* | 3/2011 | Tsuchiya et al. | 345/690 |
| 2011/0102389 A1* | 5/2011 | Park et al. | 345/205 |
| 2011/0273417 A1* | 11/2011 | Shin et al. | 345/211 |

FOREIGN PATENT DOCUMENTS

| KR | 1020080006363 | 1/2008 |
|---|---|---|
| KR | 1020080034633 | 4/2008 |

* cited by examiner

DISPLAY DEVICE HAVING A GATE DRIVER RESPONSIVE TO MULTIPLE SCAN START SIGNALS

CROSS-REFERENCE TO RELATED APPLICATION

This application claims priority to Korean Patent Application No. 10-2011-0027610 filed in the Korean Intellectual Property Office on Mar. 28, 2011, the disclosure of which is incorporated by reference herein.

BACKGROUND (a) Technical Field

Embodiments of the present inventive concept relate to a display device.

(b) Discussion of Related Art

In recent years, the demand for flat panel displays has increased rapidly. A flat panel display is thinner than solid state displays. Examples of flat panel displays include a liquid crystal display and an organic light emitting diode display.

A liquid crystal display includes two panels where a field generating electrode such as a pixel electrode and a common electrode are formed, and a liquid crystal layer is interposed therebetween. The liquid crystal display generates an electric field in the liquid crystal layer by applying a voltage to the field generating electrode to adjust orientations of liquid crystal molecules of the liquid crystal layer and the polarization of incident light, thereby displaying an image.

The liquid crystal display may include a display panel including pixels, gate, and data lines, where gate and data signals are applied to the gate and data lines, respectively. Each pixel may include a switching element implemented as a thin film transistor (TFT).

The thin film transistor enables a data signal to be applied through a data line to a corresponding pixel according to a gate signal transferred through the gate line.

While display devices have been typically used to display planar images, there is an ever growing demand for stereoscopic images. Stereoscopy refers to a technique for creating or enhancing the illusion of depth in an image by presenting two offset two dimensional (2D) images separately to the left and right eye of a viewer. The offset 2D images are combined in the brain to give the perception of a 3D image. A display device where 3D images can be perceived may be referred to as a 3D stereoscopic image displaying device.

A 3D stereoscopic image displaying device can alternate display of right-eye and left-eye images corresponding to several viewing zones using spatial or temporal division methods. For example, a 3D stereoscopic image display device can alternate between displaying a right-eye image and a left-eye image for each frame. However, an afterimage may be perceived due to interference between the right-eye and left-eye images, which reduces the image quality of the display device. The interference may be referred to as 3D crosstalk.

SUMMARY

An exemplary embodiment of the present invention provides a display device including a plurality of pixels, a plurality of gate lines, a plurality of data lines, and a gate driver connected to the plurality of gate lines. The gate driver receives a first scan start signal, a second scan start signal, and clock signals and outputs a gate-on voltage to each of the plurality of gate lines. The gate driver outputs the gate-on voltage to the plurality of gate lines such that the gate-on voltages do not overlap with each other when the gate driver receives the first scan start signal. The gate driver outputs the gate-on voltage to at least two of the gate lines at the same time when the gate driver receives the second scan start signal. The pixels may be arranged in a matrix.

An exemplary embodiment of the present invention provides a display device including a plurality of pixels, a plurality of gate lines including a first gate line group and a second gate line group, a plurality of data lines, and a gate driver connected to the plurality of gate lines. The gate driver receives a first scan start signal, a second scan start signal and clock signals, and outputs a gate-on voltage to each of the plurality of gate lines when the gate driver receives the first scan start signal. The gate driver outputs the gate-on voltage to the plurality of gate lines such that the gate-on voltages do not overlap with each other. The gate driver outputs the gate-on voltage to the first gate line group during a first cycle of the clock signal and outputs the gate-on voltage Von to the second gate line group during a second cycle of the clock signal when the gate driver receives the second scan start signal.

According to an exemplary embodiment of the inventive concept, a gate driver for a display device includes a first plurality of odd numbered stages outputting first gate signals, and a second plurality of even numbered stages outputting second gate signals. An output of each odd numbered stage is fed to an control terminal of a corresponding one of the even numbered stages. Input terminals of the odd numbered stages receive a first clock signal and input terminals of the even numbered stages receive a second clock signal that is out of phase with the first clock signal. A control terminal of the first odd numbered stage receives a first scan start signal and a control terminal of all the odd numbered stages receives a second scan start signal. The first scan signal transitions between different logic levels during a frame period of the display device. The second scan signal transitions between different logic levels during the frame period and during a black period where all of the pixels display black. The black period is adjacent the frame period.

DETAILED DESCRIPTION

The present inventive concept will be described more fully hereinafter with reference to the accompanying drawings, in which exemplary embodiments of the invention are shown. However, the described embodiments may be modified in various different ways without departing from the spirit or scope of the present disclosure.

Hereinafter, a display device according to an exemplary embodiment of the present inventive concept will be described in detail with reference to FIGS. 1 and 2.

Figure 1:
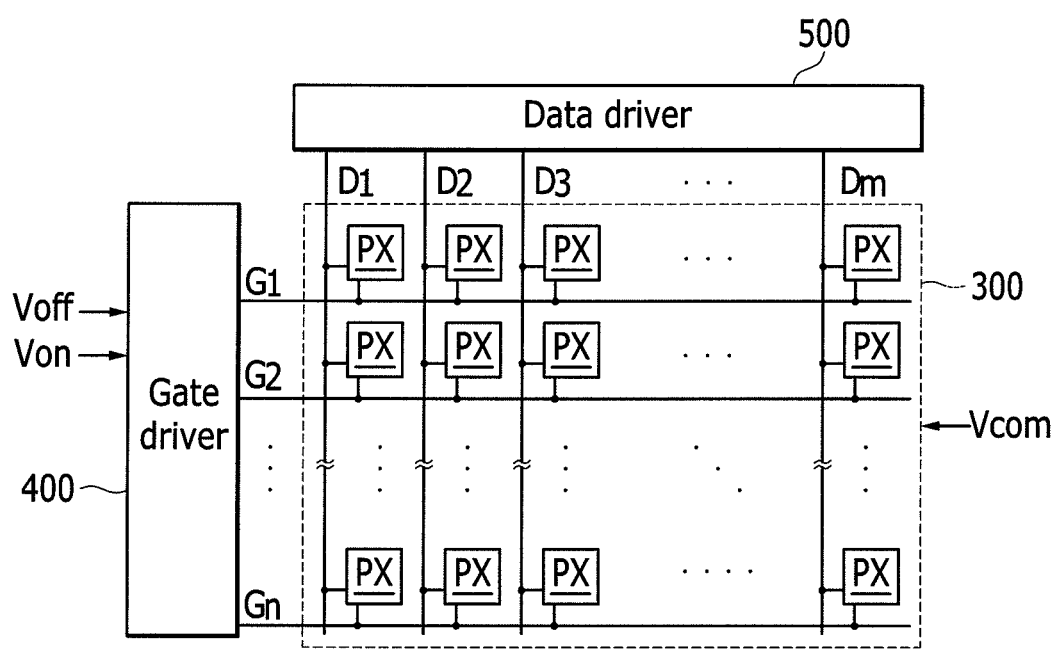
FIG. 1 is a block diagram of a display device according to an exemplary embodiment of the present inventive concept.

FIG. 1 is a block diagram of a display device according to an exemplary embodiment of the present inventive concept. The display device may be one of various flat panel displays such as a plasma display panel (PDP), a liquid crystal display, an organic light emitting diode display, etc. Further, the display device may be a 3D stereoscopic image display device or an image display device that can switch between 2D and 3D modes.

Referring to FIG. 1, the display device includes a panel assembly 300, a gate driver 400, and a data driver 500. The panel assembly 300 includes a plurality of signal lines G1-Gn and D1-Dm and a plurality of pixels PX connected thereto. The pixels PX may be arranged substantially in a matrix pattern.

The signal lines G1-Gn and D1-Dm include a plurality of gate lines G1-Gn transferring gate voltages (also referred to as a "gate signal or scan signal") and a plurality of data lines D1-Dm transferring data voltages.

The pixels PX, e.g., pixels PX connected to an i (i=1, 2, ..., n)-th gate line Gi and a j (j=1, 2, ..., m)-th data line Dj include switching elements (not shown) electrically connected to the gate line Gi and the data line Dj.

The data driver 500 is connected with the data lines D1-Dm of the panel assembly 300 and applies the data voltages to the data lines D1-Dm.

The gate driver 400 is connected with the gate lines G1-Gn of the panel assembly 300 and applies, to the gate lines G1-Gn, the gate voltages. The gate voltages may be set to one of a gate-on voltage Von for turning on the switching elements and a gate-off voltage Voff for turning off the switching elements.

Each of the drivers 400 and 500 may be integrated on the panel assembly 300 together with the signal lines G1-Gn, D1-Dm and the switching elements. In alternate embodiments, the drivers 400 and 500 may be mounted directly on the panel assembly 300 in the form of at least one integrated circuit chip, mounted on a flexible printed circuit film (not shown) to be attached to the panel assembly 300 in the form of a tape carrier package (TCP), or mounted on an additional printed circuit board (not shown). Further, the drivers 400 and 500 may be integrated as a single chip and in this example, at least one between them or at least one circuit element configuring them may be positioned outside the single chip.

The switching element serves to transfer or interrupt, to and from the pixel, the data voltage transferred through the data line according to the gate voltage transferred through the gate line. When the switching element is turned on to transfer the data voltage to the pixel, the pixel displays a luminance indicated by a gray corresponding to the data voltage.

Figure 2:
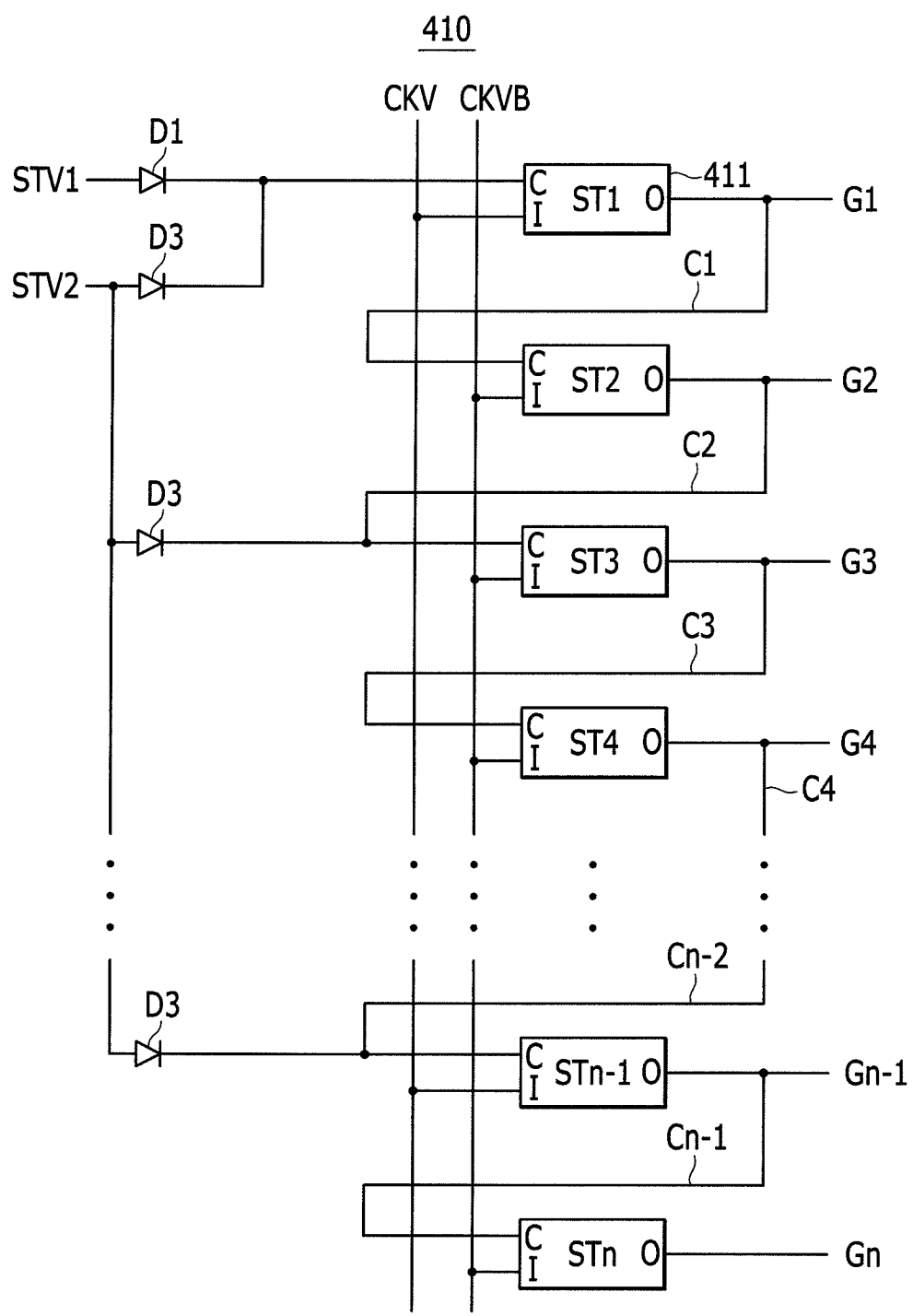
FIG. 2 is a block diagram of a gate driver of a display device according to an exemplary embodiment of the present inventive concept.
Figure 3:
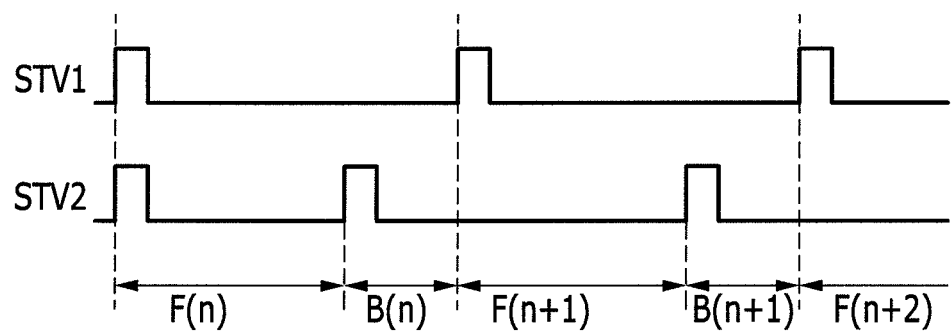
FIG. 3 is an exemplary waveform diagram of a scan start signal that may be input into the gate driver of FIG. 2.
Figure 4:
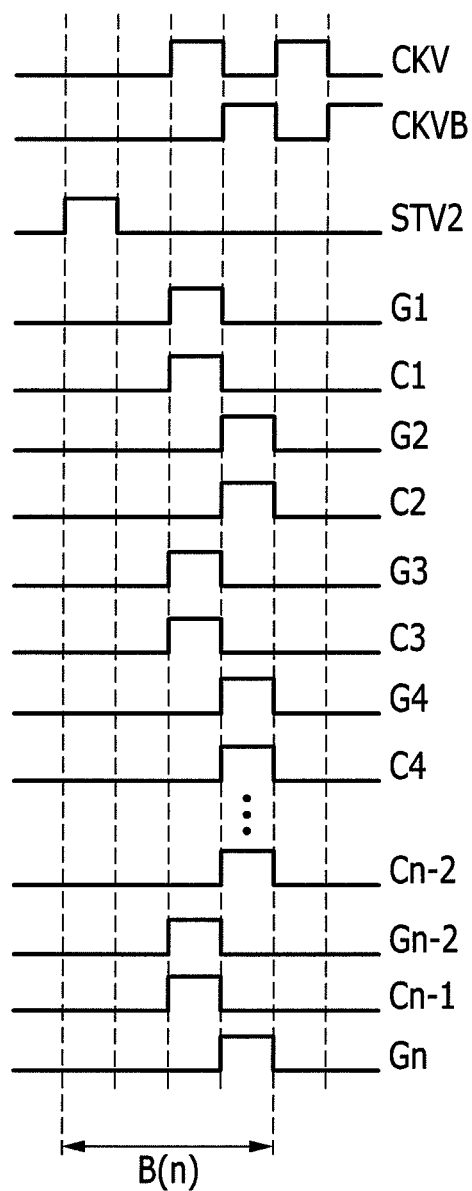
FIGS. 4 and 5 are exemplary waveform diagrams of signals that may be input into and output from the gate driver of FIG. 2.
Figure 5:
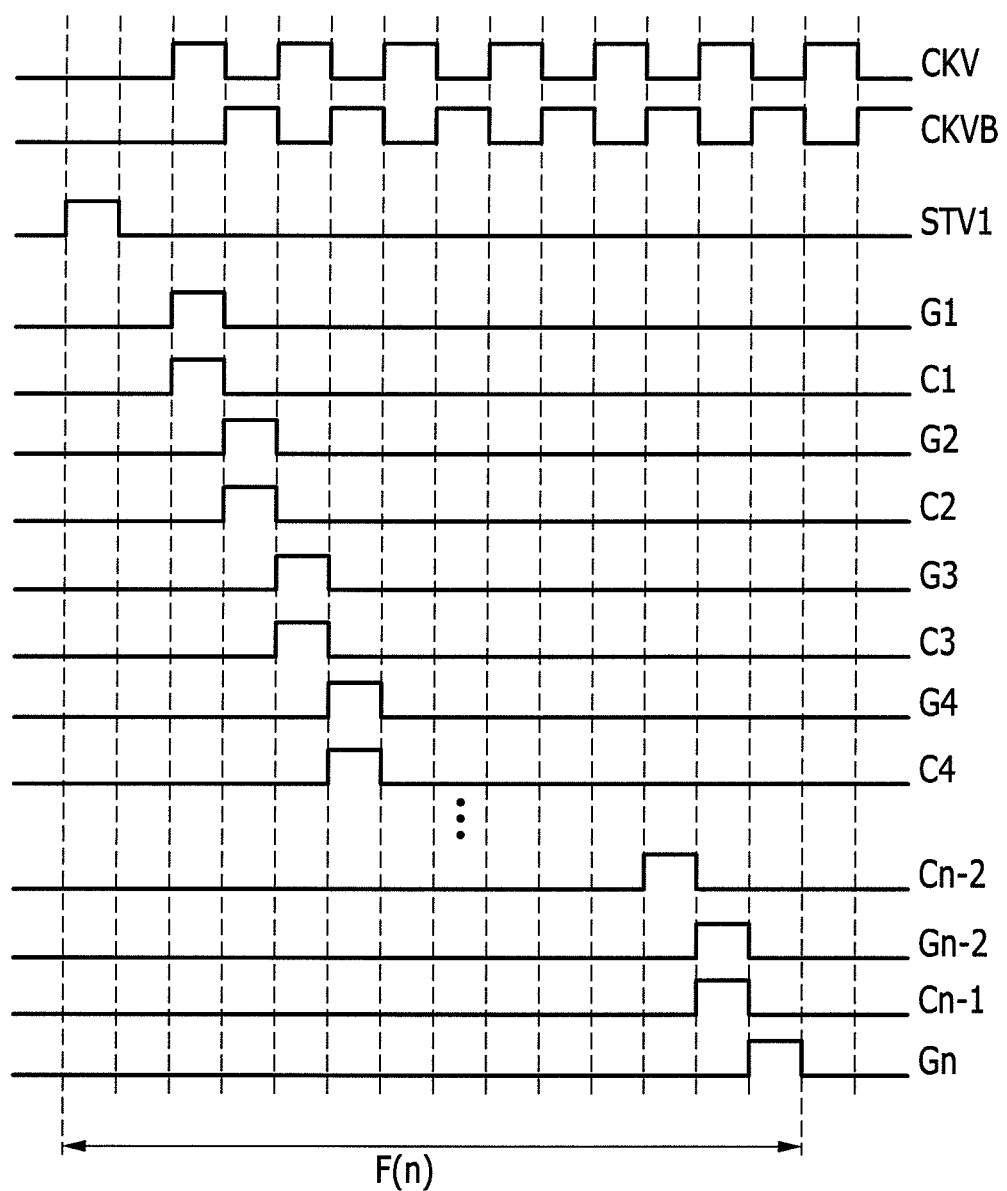

FIG. 2 is a block diagram of a gate driver of a display device according to an exemplary embodiment of the present inventive concept. FIG. 3 is an exemplary waveform diagram of a scan start signal that may be input into the gate driver of FIG. 2. FIGS. 4 and 5 are exemplary waveform diagrams of signals that may be input into and output from the gate driver of FIG. 2. The gate driver 410 of FIG. 2 is an exemplary embodiment of the gate driver 400 of FIG. 1.

Referring to FIG. 2, the gate driver 410 includes a plurality of stages ST1-STn 411 connected to the gate lines G1-Gn, respectively. The gate driver 410 receives scan start signals STV1 and STV2 and clock signals CKV and CKVB and outputs the gate voltage to the gate lines G1-Gn. Hereinafter, n is assumed to be an even number, but n is not limited to an even number.

Each stage 411 includes a control terminal C, an input terminal I, and an output terminal O. The output terminal O of each stage 411 is connected to a corresponding one of the gate lines G1-Gn. For example, the output terminal O of an i-th stage STi is connected to the i-th gate line Gi (i=1, 2, ..., n). Accordingly, the output terminal O of each stage 411 outputs a corresponding one of the gate voltages.

The input terminal I of each stage 411 is connected to a wire, which receives a corresponding one of the clock signals CKV and CKVB. The input terminals I of odd numbered stages ST1, ST3, ..., STn−1 are connected to a wire to which the first clock signal CKV is applied and the input terminals I of even numbered stages ST2, ST4, ..., STn are connected to a wire to which the second clock signal CKVB is applied.

The control terminal C of each stage 411 except for the first stage ST1, for example, the j-th stage STj is connected to the output terminal O of a previous stage STj−1 (j=2, 3, ..., n). For example, the control terminal C of the j-th stage STj receives the same signal as the gate voltage output through the gate line Gi connected to the previous stage STj−1 as a carry signal Cj−1.

The wire to which the first scan start signal STV1 is applied is connected to the control terminal C of the first stage ST1. The wire to which the first scan start signal STV1 is applied includes a first diode D1. An anode terminal of the first diode D1 is connected with the wire to which the first scan start signal STV1 is applied and a cathode terminal of the first diode D1 is connected to the control terminal C of the first stage ST1.

The wire to which the second scan start signal STV2 is applied is connected to the control terminal C of each of the odd numbered stages ST1, ST3, ..., STn−1. The wire to which the second scan start signal STV2 is applied and the control terminal C of each of the odd numbered stages ST1, ST3, ..., STn−1 are connected to each other through a third diode D3. An anode terminal of the third diode D3 is connected with the wire to which the second scan start signal STV2 is applied and a cathode terminal of the third diode D3 is connected to the control terminal C of a corresponding one of the odd numbered stages ST1, ST3, ..., STn−1.

When the stage 411 receives a high-level signal through the control terminal C, the stage 411 transitions to an on state. When the stage 411 is in the on state, the stage 411 outputs a signal input into its input terminal I through its output terminal O. However, when the high-level signal is input into both the control terminal C and the input terminal I of the stage 411, an abnormal operation may occur that prevents the signal input from the input terminal I from being output normally through the output terminal O of stage 411. Therefore, after the high-level signal is applied to the control terminal C of the stage 411, the high-level signal should be input into the input terminal I.

When the high-level signal is output through the output terminal O of the stage 411, the stage 411 transitions to an off state. When the stage 411 is in the off state, the stage 411 does not output the signal input to its control terminal C through its output terminal O.

For example, the j-th stage STj transitions to the on state by receiving the high-level signal through its control terminal C to output the signal received through the input terminal I through its output terminal O. When the j-th stage STj transfers a high-level carry signal Cj to a next stage STj+1, the j-th stage STj may transition to the off state. In addition, when the j-th stage STj receives the high-level signal through its control terminal C again, the j-th stage STj transitions to the on state.

Referring to FIG. 3, each of the first scan start signal STV1 and the second scan start signal STV2 has the high-level signal periodically. A driving period of the display device may be divided into frame periods (..., F(n), F(n+1), ...) and black periods (..., B(n), B(n+1), ...) according to periods in which the scan start signals STV1 and STV2 are in a high level. The frame periods (..., F(n), F(n+1), ...) are the periods in which a data voltage corresponding to an image signal of the pixel is applied to each pixel. The black periods (..., B(n), B(n+1), ...) are the periods between the frame periods (..., F(n), F(n+1), ...) in which a data voltage corresponding to a predetermined gray is applied to all pixels. For example, the predetermined gray may be an intensity value of 0, which is the minimum gray. In an example where the predetermined gray is 0, all the pixels receive a data voltage that causes the pixels to display a black color during the black periods (..., B(n), B(n+1), ...). The data voltage that causes the pixels to display the black color may be referred to as a black data voltage.

The black periods (..., B(n), B(n+1), ...) located between the frame periods (..., F(n), F(n+1), ...) may improve the image quality of the display device. When the display device operates in a 3D mode, the display device may alternate between displaying a right-eye image and a left-eye image for each frame. For example, in an n-th frame period F(n), the right-eye image is displayed, and in an n+1-th frame period F(n+1), which is a subsequent frame period, the left-eye image is displayed. However, if an n-th black period B(n) were not present between the n-th frame period F(n) and the n+1-th frame period F(n+1), an afterimage may be perceived, which is referred to as 3D crosstalk.

In an alternate embodiment, the black periods (..., B(n), B(n+1), ...) may be inserted between the frame periods of a 2D display device. The insertion of the black periods between the frame periods of the 2D device may improve its image quality.

When the level of the scan start signal STV1 is changed from a low level to the high level, the frame periods (..., F(n), F(n+1), ...) start and when the level of the scan start signal STV2 is changed from the low level to the high level, the frame periods (..., F(n), F(n+1), ...) end and the black periods (..., B(n), B(n+1), ...) start.

FIG. 4 is an exemplary waveform diagram of signals that may be input into and output from the gate driver 410 of FIG. 2 during an n-th black period B(n). The signals of the waveform diagram of FIG. 4 may be applied similarly in the black periods other than the n-th black period B(n).

Referring to FIGS. 2 and 4, when the level of the second scan start signal STV2 is changed from the low level to the high level, the n-th black period B(n) starts. The second scan start signal STV2 of the high level may be applied to the control terminals C of the odd numbered stages ST1, ST3, ..., STn−1 through the third diode D3 at the same time or at substantially the same time. Therefore, the odd numbered stages ST1, ST3, ..., STn−1 may transition to the on state at the same time or at substantially the same time.

When the level of the second scan start signal STV2 is changed from the high level to the low level, the second scan start signal STV2 of the low level is not applied to the odd numbered stages ST1, ST3, ..., STn−1 by the third diode D3. Therefore, the odd numbered stages ST1, ST3, ..., STn−1 transition to the on state.

In an exemplary embodiment of the inventive concept, the duty ratio of each of the clock signals CKV and CKVB is 50% and a phase difference between them is 180 degrees. In this example, generation of the clock signals CKV and CKVB may start after the level of the second scan start signal STV2 is changed from the high level to the low level, which may prevent the high levels of the clock signals CKV and CKVB and the high level of the second scan start signal STV2 from being applied to the stage 411 at the same time. In an alternate embodiment, the clock signals CKV and CKVB are continuously maintained and the second scan start signal STV2 has the high level during the low level of the first clock signal CKV.

The input terminals I of the odd numbered stages ST1, ST3, ..., STn−1 receive the first clock signal CKV. When the level of the first clock signal CKV is changed to the high level after the second scan start signal STV2 of the high level is applied, the odd numbered stages ST1, ST3, ..., STn−1 output a gate voltage of the high level. For example, the gate-on voltage Von is applied to the odd numbered gate lines G1, G3, ..., Gn−1 at the same time or at substantially the same time. Switching elements of pixels of odd rows connected to the odd numbered gate lines G1, G3, ..., Gn−1 to which the gate-on voltage Von is applied are turned on at the same time or at substantially the same time to receive the black data voltage. Further, the odd numbered stages ST1, ST3, ..., STn−1 outputting the gate-on voltage Von output carry signals C1, C3, ..., Cn−1 of the high level to the control terminals C of the next stages ST2, ST4, ..., STn at the same time or at substantially the same time. The even numbered stages ST2, ST4, ..., STn receiving the carry signals C1, C3, ..., Cn−1 of the high level transition to the on state at the same time or substantially the same time.

The input terminals I of the even numbered stages ST2, ST4, ..., STn receive the second clock signal CKVB. Therefore, the even numbered stages ST2, ST4, ..., STn receive the carry signals C1, C3, ..., Cn−1 of the high level through the control terminals C and thereafter, receive the second clock signal CKVB of the high level through the input terminal I. For example, the high-level signal is not applied to the input terminals I and the control terminals C of the even numbered stages ST2, ST4, ..., STn at the same time. While the second clock signal CKVB of the high level is applied, the even numbered stages ST2, ST4, ..., STn output the gate voltage of the high level (e.g., the gate-on voltage Von) to the even numbered gate lines G2, G4, ..., Gn at the same time or at substantially the same time. Switching elements of pixels of even rows connected to the even numbered gate lines G2, G4, ..., Gn to which the gate-on voltage Von are applied are turned on to receive the black data voltage.

As such, all the pixels of the display device receive the black data voltage during one period of the clock signals CKV and CKVB. Therefore, the length of the black period can be reduced.

FIG. 5 is an exemplary waveform diagram of signals that may be input into and output from the gate driver 410 of FIG. 2 in an n-th frame period F(n). The waveform diagram of FIG. 5 may be applied similarly in the frame periods other than the n-th black period F(n).

Referring to FIGS. 2 and 5, when the level of the first scan start signal STV1 is changed from the low level to the high level, the n-th frame period F(n) starts. The first scan start signal STV1 of the high level is applied to the control terminal C of the first stage ST1 through the first diode D1 and then the first stage ST1 transitions to the on state.

When the level of the first scan start signal STV1 is changed from the high level to the low level, the first scan start signal STV1 of the low level is not applied to the first stage by the first diode D1. Therefore, the first stage ST1 maintains the on state.

In an embodiment of the invention, a duty ratio of each of the clock signals CKV and CKVB is 50% and a phase difference between them is 180 degrees. In this example, generation of the clock signals CKV and CKVB may start after the level of the first scan start signal STV1 is changed from the high level to the low level, which may prevent the high levels of the clock signals CKV and CKVB and the high level of the first scan start signal STV1 from being applied to the stage 411 at the same time. In an alternate embodiment, the clock signals CKV and CKVB are continuously maintained and the first scan start signal STV1 may be at the high level when the first clock signal CKV is initially at a low level.

When the level of the first clock signal CKV is changed to the high level after the first scan start signal STV1 of the high level is applied, the first stage ST1 outputs the gate voltage of the high level (e.g., the gate-on voltage Von) to the first gate line G1. Switching elements of pixels of a first row connected to the first gate line G1 to which the gate-on voltage Von is applied are turned on, such that the pixels of the first row receive data voltages corresponding to an image signal of each pixel. Further, the first stage ST1 outputting the gate-on voltage Von outputs the carry signal C1 of the high level to the control terminals C of the next stage ST2 at the same time or at substantially the same time. Therefore, the first stage ST1 is in the off state and the second stage ST2 is in the on state. While the first stage ST1 is in on the off state, the first stage ST1 does not output the gate-on voltage Von to the first gate line G1 even though the first clock signal CKV of the high level is applied to the input terminal I.

When the level of the second clock signal CKVB is changed to the high level, the second stage ST2 outputs the gate-on voltage to the second gate line G2. Switching elements of pixels of a second row connected to the second gate line G2 to which the gate-on voltage Von is applied are turned on, such that the pixels of the second row receive data voltages corresponding to an image signal of each pixel. Further, the second stage ST2 outputting the gate-on voltage Von outputs the carry signal C2 of the high level to the control terminal C of the next stage ST3. Therefore, the second stage ST2 is in the off state and the third stage ST3 is in the on state.

By such a method, the plurality of stages 411 of the gate driver 410 output the gate-on voltage Von in sequence. The gate driver 410 outputs the gate-on voltage to the gate lines G1-Gn during the n-th frame period F(n) such that the gate-on voltages do not overlap with one another. Therefore, all the pixels of the display device receive data voltages corresponding to each pixel during an n/2 cycle of the clock signals CKV and CKVB.

Figure 6:
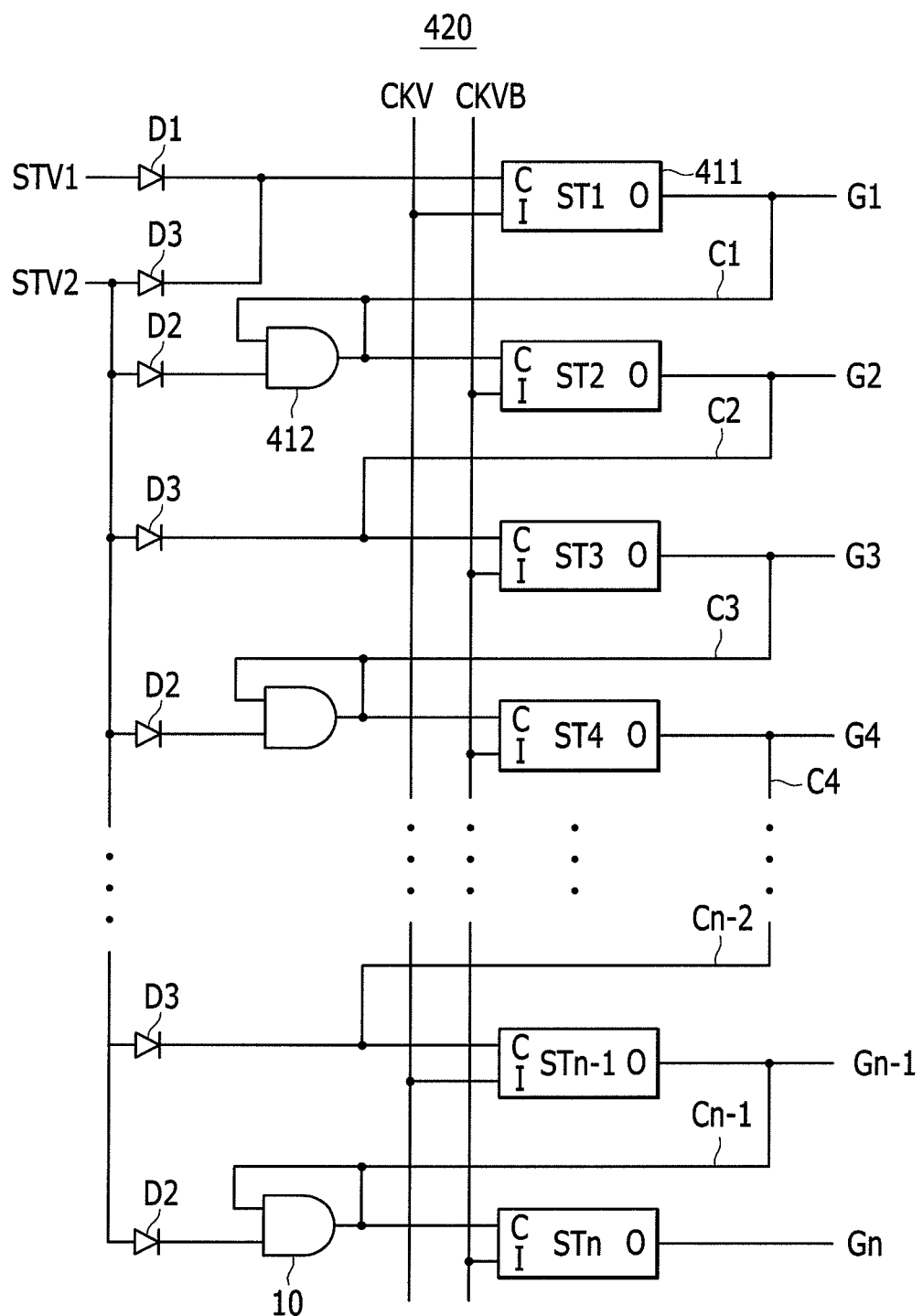
FIG. 6 is a block diagram of a gate driver of a display device according to an exemplary embodiment of the present inventive concept.

FIG. 6 is a block diagram of a gate driver of a display device according to an exemplary embodiment of the present inventive concept. The gate driver 420 of FIG. 6 is an exemplary embodiment of the gate driver 400 of FIG. 1. The reference numerals illustrated in FIG. 6 refer to the same components as the exemplary embodiment of FIG. 2.

Referring to FIG. 6, the gate driver 420 includes a plurality of stages ST1-STn 411 connected to gate lines G1-Gn, respectively. The gate driver 420 receives scan start signals STV1 and STV2 and clock signals CKV and CKVB and outputs a gate voltage through the gate lines G1-Gn. Hereinafter, it is assumed that n is an even number, but n is not limited to an even number.

A wire to which the second scan start signal STV2 is applied is connected to a control terminal C of each stage 411. The wire to which the second scan start signal STV2 is applied and the control terminal C of each of odd numbered stages ST1, ST3, . . . , STn−1 are connected to each other through a third diode D3. An anode terminal of the third diode D3 is connected with the wire to which the second scan start signal STV2 is applied and a cathode terminal of the third diode D3 is connected to the control terminal C of a corresponding one of the odd numbered stages ST1, ST3, . . . , STn−1.

The wire to which the second scan start signal STV2 is applied and the control terminal C of each of even numbered stages ST2, ST4, . . . , STn are connected to each other through a second diode D2 and an AND gate 412. An anode terminal of the second diode D2 is connected with the wire to which the second scan start signal STV2 is applied and a cathode terminal of the second diode D2 is connected to a first input terminal of the AND gate 412. A second input terminal of the AND gate 412 is connected with output terminals O of a corresponding one of previous odd numbered stages ST1, ST3, . . . , STn−1 and an output terminal of the AND gate 412 is connected with the control terminal C of a corresponding one of the even numbered stages ST2, ST4, . . . , STn.

The gate driver 420 of FIG. 6 may perform the same driving operation as the gate driver 410 of FIG. 2. For example, the waveforms of the signals input into and output from the gate driver of FIGS. 3 to 5 may be applied to the gate driver 420 of FIG. 6.

Referring to FIGS. 4 and 6, the AND gate 412 cannot receive the second scan start signal STV2 of a high level, and carry signals C1, C3, . . . , Cn−1 of the high level from the previous stages ST1, ST3, . . . , STn−1 at the same time. Therefore, the AND gate 412 prevents the second scan start signal STV2 of the high level from being applied to the even numbered stages ST2, ST4, . . . , STn.

As a result, the second scan start signal STV2 of the high level is applied only to the odd numbered stages ST1, ST3, . . . , STn−1, such that the odd numbered stages ST1, ST3, . . . , STn−1 output the gate-on voltage earlier than the even numbered stages ST2, ST4, . . . , STn at the same time or at substantially the same time.

After receiving the carry signals C1, C3, . . . , Cn−1 of the high level from the previous odd numbered stages ST1, ST3, . . . , STn−1, the even numbered stages ST2, ST4, . . . , STn output the gate-on voltage at the same time or at substantially the same time.

According to an exemplary embodiment of the invention, a gate driver in which all pixels of a display device operate to receive black data voltages during one cycle of clock signals CKV and CKVB during black periods has been described.

However, since load margins of output elements of control signals such as the scan start signals STV1 and STV2 and the clock signals CKV and CKVB and a data driver are limited, the gate driver may be divided into a plurality of stage blocks.

Figure 7:
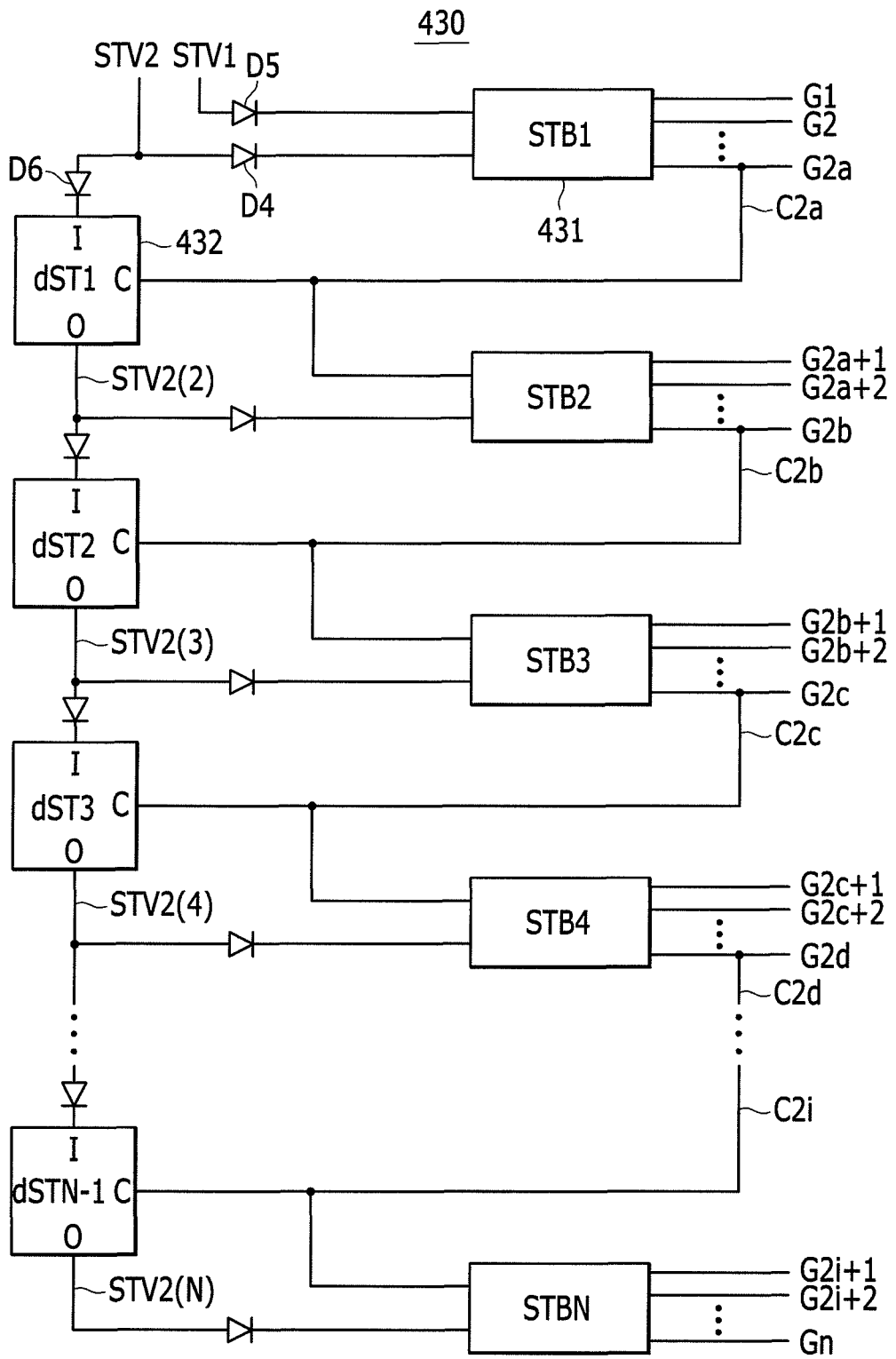
FIG. 7 is a block diagram of a gate driver of a display device according to an exemplary embodiment of the present inventive concept.
Figure 8:
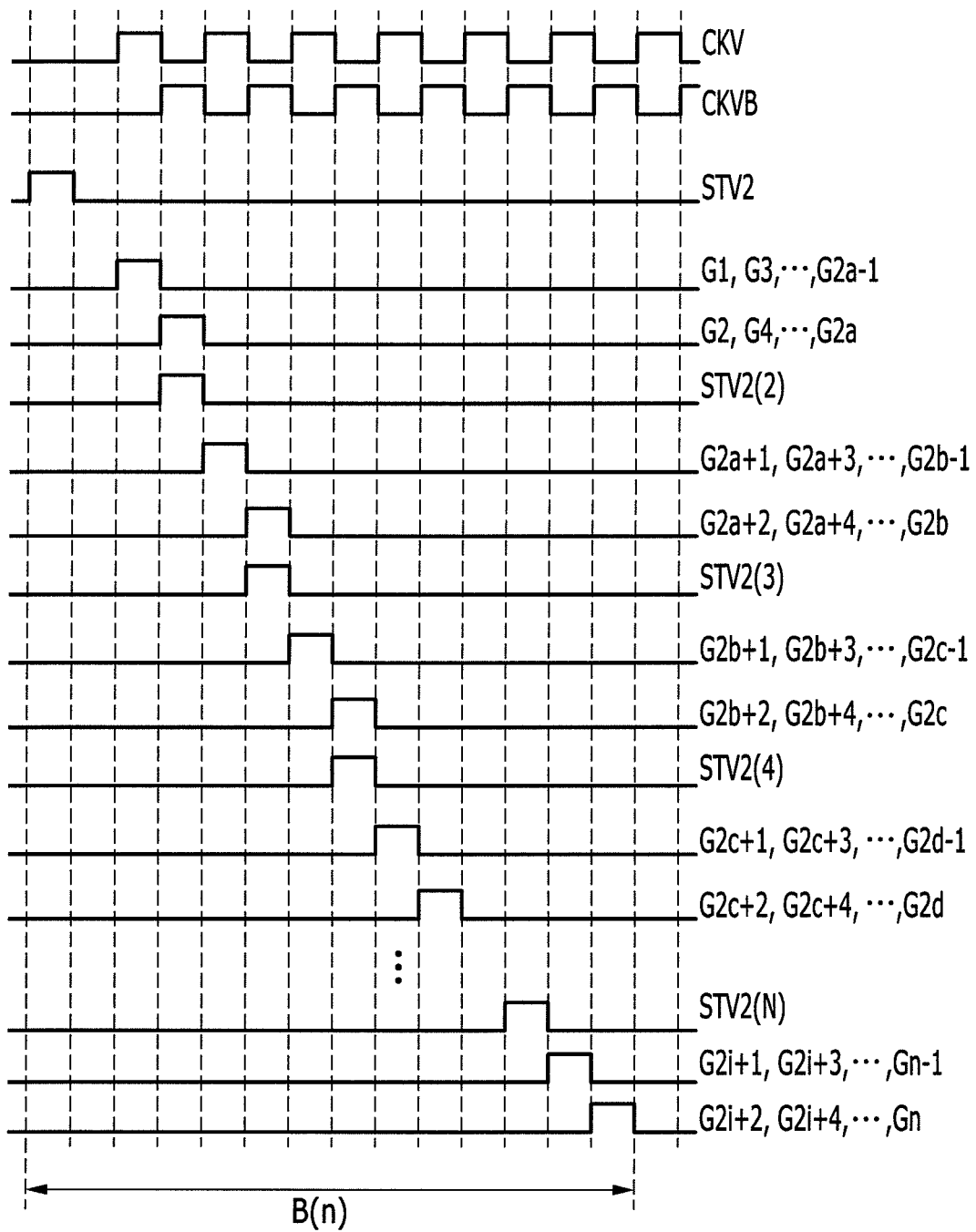
FIG. 8 is an exemplary waveform diagram of signals that may be input into and output from the gate driver of FIG. 7.

FIG. 7 is a block diagram of a gate driver of a display device according to an exemplary embodiment of the present inventive concept and FIG. 8 is an exemplary waveform diagram of signals input into and output from the gate driver of FIG. 7. The gate driver 430 of FIG. 7 is an exemplary embodiment of the gate driver 400 of FIG. 1.

Referring to FIG. 7, the gate driver 430 includes a plurality of stage blocks STB-STBN 431 and a plurality of dummy stages dST1-dSTN−1 432. Each dummy stage 432 is connected between two stage blocks 431. For example, an i-th dummy stage dSTi, i=1, 2, . . . , N−1 is connected between an i-th stage block STBi and an i+1-th stage block STBi+1.

Each stage block 431 includes a plurality of stages (not shown), and is connected with two input lines (a first input line and a second input line) and connected with a plurality of output lines. Each stage block 431 may be implemented as the gate driver 410 of FIG. 2 or the gate driver 420 of FIG. 6.

The first input line and the second input line of each stage block 431 correspond to the wire into which the first scan start signal STV1 and the second scan start signal STV2 of the gate driver 410 of FIG. 2 are input, respectively. A control terminal of a first stage of each stage block 431 is connected to the first input line and the second input line of each stage block 431. Further, control terminals of odd numbered stages of each stage block 431 are connected to the second input line of each stage block 431. When each stage block 431 receives a signal corresponding to the first scan start signal through the first input line, each stage block 431 operates according to the frame period as shown in FIG. 5. When each stage block 431 receives a signal corresponding to the second scan start signal STV2 through the second input line, each stage block 431 operates according to the black period as shown in FIG. 4.

A plurality of gate lines G1-Gn may be divided into a plurality of gate line groups G1-G2a; G2a+1-G2b; G2b+1-G2c; G2c+1-G2d; . . . ; G2i+1-Gn. Each of the gate line groups G1-G2a; G2a+1-G2b; G2b+1-G2c; G2c+1-G2d; . . . except for the last gate line group G2i+1-Gn includes an even number of gate lines. The last gate line group G2i+1-Gn includes an odd or even number of gate lines according to the number n of total gate lines of the display device.

Each stage block 431 is connected to a corresponding one of the gate line groups G1-G2a; G2a+1-G2b; G2b+1-G2c; G2c+1-G2d; . . . ; G2i+1-Gn. For example, the second stage block STB2 is connected to the second gate line group G2a+1-G2b.

The wire to which the first scan start signal STV1 is applied is connected with the first input line of the first stage block STB1 through a fifth diode D5. An anode terminal of the fifth diode D5 is connected with the wire to which the first scan start signal STV1 is applied and a cathode terminal of the fifth diode D5 is connected to the first input terminal of the first stage block STB1.

The first input line of the stage block 431 except for the first stage block STB1, for example, the third stage block STB3 is connected to the last gate line G2b of the previous stage block STB2 to receive a carry signal C2b. Therefore, when the gate driver 430 is driven by the first scan start signal STV1, the gate driver 430 operates in the same manner as FIG. 5.

The wire to which the second scan start signal STV2 is applied is connected with the second input line of the first stage block STB1 through a fourth diode D4 and connected with the input terminal I of the first dummy stage dST1 through a sixth diode D6. Anode terminals of the fourth and sixth diodes D4 and D6 are connected with the wire to which the second scan start signal is applied, and a cathode terminal of the fourth diode D4 is connected with the second input line of the first stage block STB1 and a cathode terminal of the sixth diode D6 is connected with the input line I of the first dummy stage dST1.

The input terminal I of each dummy stage 432 (e.g, the second stage dST2) is connected with the output terminal O of the previous stage (e.g., dSTt1) through a sixth diode D6. The anode terminal of the sixth diode D6 is connected with the output terminal O of the previous stage (e.g., dST1) and the cathode terminal of the sixth diode D6 is connected with the input terminal I of the current stage (e.g., second stage dST2). The control terminal C of the second dummy stage dST2 is connected to the last gate line G2b of the second stage block STB2 and the first input line of the third stage block STB3. The output terminal O of the second dummy stage dST2 is connected with the second input line of the third stage block STB3 through the fourth diode D4 and is connected with the input terminal I of the next dummy stage dST3 through the sixth diode D6. The anode terminal of the fourth diode D4 is connected with the output terminal O of the second dummy stage dST2 and the cathode terminal of the fourth diode D4 is connected with the second input line of the third stage block STB3.

The input terminal I of the first dummy stage dST1 is connected with the wire to which the second scan start signal STV2 is applied through the sixth diode D6. The output terminal O of the last dummy stage dSTN-1 is connected with the second input line of the last stage block STBN through the fourth diode D4.

Therefore, when the gate driver 430 is driven by the second scan start signal STV2, the previous stage block (e.g., the second stage block STB2) is driven and thereafter, the next stage block (e.g., the third stage block STB3) is driven.

FIG. 8 is an exemplary waveform diagram of signals that may be input into and output from the gate driver 430 of FIG. 7 during an n-th black period B(n). The signals of the waveform diagram of FIG. 8 may be applied similarly during the black periods other than the n-th black period B(n).

Referring to FIGS. 7 and 8, when the level of the second scan start signal STV2 is changed from a low level to a high level, the n-th black period B(n) starts. The second scan start signal STV2 of the high level is input into the second input line of the first stage block STB1 through the fourth diode D4 and at the same time or at substantially the same time, input into the input terminal I of the first dummy stage dST1 through the sixth diode D6.

When the level of the second scan start signal STV2 is changed from the high level to the low level, the second scan start signal STV2 of the low level is not input into the second input line of the first stage block STB1 and not input into the input terminal I of the first dummy stage dST1 by the fourth diode D4 and the sixth diode D6. Therefore, the first dummy stage maintains the high-level signal at the input terminal I thereof.

When the level of the first clock signal CKV is changed to the high level, the first stage block STB1 outputs the gate-on voltage to the odd numbered gate lines G1, G3, . . . , G2a-1 at the same time or substantially the same time and when the level of the second clock signal CKVB is changed to the high level, the first stage block STB1 outputs the gate-on voltage to the even numbered gate lines G2, G4, . . . , G2a at the same time or at substantially the same time (see FIGS. 2 and 4).

The gate-on voltage is output to the last gate line G2a of the first stage block STB1 and at the same time or at substantially the same time, the carry signal C2a of the high level is applied to the control terminal C of the first dummy stage ST1. Therefore, the first dummy stage is in an on state to output the high-level signal maintained at the input terminal I thereof through the output terminal O thereof. The signal output through the output terminal O of the first dummy stage dST1 is a second scan start signal STV2(2) delayed from the second scan start signal STV2 by the high level. The second scan start signal STV2(2) of the high level is input into the second input line of the second stage block STB2 and at the same time or substantially the same time, input into the input terminal I of the second dummy stage dST2. The second stage block STB2 also operates similarly to the first stage block STB1. For example, the second stage block STB2 outputs the gate-on voltage to the odd numbered gate lines G2a+1, G2a+3, . . . , G2b-1 at the same time or at substantially the same time when the first clock signal CKV is at the high level and outputs the gate-on voltage to the even numbered gate lines G2a+2, G2a+4, . . . , G2b at the same time or at substantially the same time when the second clock signal CKVB is at the high level. Other stage blocks STB3-STB also output the gate-on voltage in the same manner as the previous stage block after the previous stage block is driven.

The stage blocks STB2-STBN except for the first stage block STB1 receive a corresponding one of the second scan start signals STV2(2), STV2(3), . . . , STV2(N) of the high level when the second clock signal CKVB is at the high level. However, since each stage block 431 is implemented as shown in FIG. 2 or 4, the second scan start signals STV2(2), STV2(3), . . . , STV2(N) of the high level are applied to only a corresponding one of the odd numbered stages of each stage block 431. Therefore, since the high-level signal is not applied to the input terminals and the control terminals of the even numbered stages of each stage block 431 at the same time, the stage does not operate abnormally.

The gate-on voltage may be applied to all gate lines connected to one stage block 431 during one cycle of the clock signals CKV and CKVB. Therefore, all the pixels of the display device receive the black data voltage during N cycles of the clock signals CKV and CKVB.

As the number of stages constituting each stage block 431 increases, the number N of the stage blocks 431 decreases and the black period can be reduced. However, when the number of stages constituting each stage block 431 increases, loads of output elements of the control signals such as the scan start signals STV1 and STV2 and the clock signals CKV and CKVB and a data driver increase. Accordingly, the number N of the stage blocks 431 may be determined according to output performance of the control signal output elements and the data driver.

Figure 9:
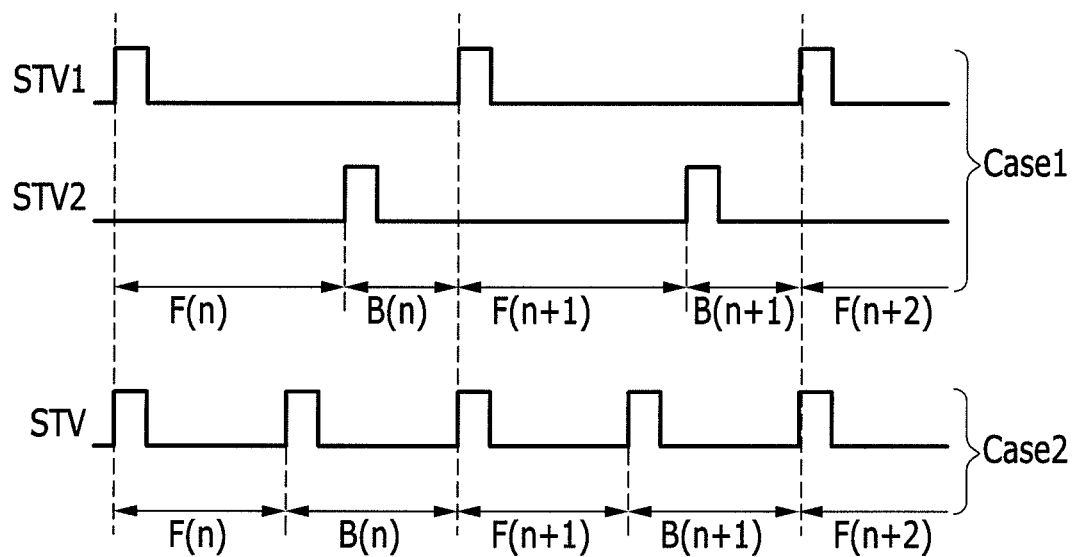
FIG. 9 is a diagram comparing a case 1 where two scan start signals STV1 and STV2 are used according to an exemplary embodiment of the present inventive concept against a case 2 where a single scan start signal STV is used.

FIG. 9 is a diagram that compares a case 1 where two scan start signals STV1 and STV2 are used according to an exemplary embodiment of the present inventive concept against a case 2 where a single scan start signal STV is used.

Referring to FIG. 9, in case 1, where two scan start signals STV1 and STV2 are used, since a gate-on voltage can be applied to a plurality of gate lines during a black period at the same time or at substantially the same time, the length of a frame period may be shorter than that of the black period. In case 2, where a single scan start signal STV is used, since driving types of the black period and the frame period are the same or substantially the same as each other, the lengths of the frame period and the black period are the same or substantially the same as each other. The timing of the scan start signals of case 1 may be ½ that of case 2. For example, when the timing of the scan start signal of case 2 is 240 Hz, the timing of the scan start signals of case 1 is 120 Hz. Further, when the timing of the scan start signal of case 2 is 120 Hz, the timing of the scan start signals of case 1 is 60 Hz.

According to an exemplary embodiment of the present inventive concept, when two scan start signals STV1 and STV2 are used, the gate-on voltage can be applied to the plurality of gate lines during the black period at the same or substantially the same time. Therefore, since the length of the black period can be smaller than that of the frame period, the driving timing can be secured. Further, image quality may be improved by inserting the black period between the frame periods, thereby reducing or eliminating a 3D crosstalk phenomenon.

While the inventive concept has been described in connection with exemplary embodiments thereof, it is to be understood that the inventive concept is not limited to the disclosed embodiments, but, on the contrary, is intended to cover various modifications and equivalent arrangements included within the spirit and scope of the disclosure.

What is claimed is:

1. A display device, comprising:
a plurality of pixels;
a plurality of gate lines;
a plurality of data lines; and
a gate driver connected to the plurality of gate lines,
wherein the gate driver receives a first scan start signal, a second scan start signal and clock signals, and outputs a gate-on voltage to each of the plurality of gate lines,
wherein the gate driver outputs a gate-on voltage to the plurality of gate lines such that the gate-on voltages do not overlap with each other when the gate driver receives the first scan start signal, and
wherein the gate driver outputs a gate-on voltage to at least two of the gate lines at substantially the same time during a first period when the gate driver receives the second scan start signal,
wherein the gate driver outputs a gate-on voltage to another at least two of the gate lines at substantially the same time during a second period after the first period in response to a delayed version of the second scan start signal,
wherein the at least two gate lines and the another at least two gate lines are either both consecutive odd lines or both consecutive even lines of the gate lines,
wherein the plurality of data lines transfer a black data voltage when the gate driver receives the second scanning start signal,
wherein the gate driver includes a plurality of stages connected to the gate lines, respectively, each of the plurality of stages includes a control terminal, an input terminal, and an output terminal, the input terminal receives the clock signals and the output terminal is connected to the corresponding gate line, the control terminal of the first stage of the plurality of stages receives the scan start signals, and the control terminals of the remaining stages are connected to output terminals of previous stages,
wherein the clock signals include a first clock signal and a second clock signal, a phase difference between the first clock signal and the second clock signal is 180 degrees, and input terminals of odd numbered stages of the plurality of stages receive the first clock signal and input terminals of even-numbered stages of the plurality of stages receive the second clock signal,
wherein control terminals of the odd numbered stages receive the second scan start signal,
wherein the gate driver receives the second scan start signal when the first clock signal is at a low level, and
wherein the gate driver further includes a plurality of AND gates, output terminals of the plurality of AND gates are connected to control terminals of the even numbered stages, and first input terminals of the plurality of AND gates receive the second scan start signal and second input terminals of the plurality of AND gates are connected to output terminals of a corresponding one of the odd numbered stages.

2. The display device of claim 1, wherein the gate driver outputs the gate-on voltage to the plurality of gate lines during one cycle of the clock signal when the gate driver receives the second scan start signal.

3. The display device of claim 1, wherein the second scan start signal is applied to the gate driver between a first frame period and a second frame period.

4. The display device of claim 3, wherein a data voltage of a right-eye image is applied to the plurality of data lines during the first frame period and a data voltage of a left-eye image is applied to the plurality of data lines during the second frame period.

5. A display device comprising:
a plurality of pixels;
a plurality of gate lines including a first gate line group and a second gate line group;
a plurality of data lines;

a gate driver connected to the plurality of gate lines, receiving a first scan start signal, a second scan start signal and a clock signal, and outputting a gate-on voltage to each of the plurality of gate lines;

a first stage block connected to the first gate line group;

a second stage block connected to the second gate line group; and a dummy stage connected with the first stage block and the second stage block, wherein the gate driver outputs a gate-on voltage to the plurality of gate lines such that the gate on voltages do not overlap with each other when the gate driver receives the first scan start signal, and wherein the gate driver outputs the gate-on voltage to the first gate line group during a first cycle of the clock signal and outputs the gate-on voltage to the second gate line group during a second cycle of the clock signal when the gate driver receives the second scan start signal, wherein the second stage block includes a first input line connected to the last gate line of the first gate line group, wherein the first stage block includes a first input line and a second input line, and the first input line of the first stage block receives the first scan start signal and the second input line of the first stage block receives the second scan start signal, wherein the second stage block-includes a second input line connected to the dummy stage, wherein the dummy stage includes a control terminal, an input terminal, and an output terminal, the control terminal is connected to the last gate line of the first gate line group, the input terminal receives the second scan start signal, and the output terminal is connected with the second input line of the second stage block.

6. The display device of claim 5, wherein: each of the first stage block and the second stage block includes a plurality of stages, each of the plurality of stages includes a control terminal, an input terminal and an output terminal, the input terminal receives the clock signal and the output terminal is connected to the corresponding gate line, the control terminal of the first stage of each stage block is connected to the first input line and the second input line of each stage block, and the control terminals of the remaining stages are connected to output terminals of a corresponding one of previous stages.

7. The display device of claim 6, wherein: the clock signal comprises a first clock signal and a second clock signal, a phase difference between the first clock signal and the second clock signal is 180 degrees, and, input terminals of odd numbered stages of each stage block receive the first clock signal and input terminals of even-numbered stages of each stage block receive the second clock signal.

8. The display device of claim 7, wherein control terminals of the odd numbered stages of each stage block are connected to the second input line of each stage block.

9. The display device of claim 8, wherein the second scan start signal is applied when the first clock signal is at a low level.

10. The display device of claim 9, wherein: each stage block further includes a plurality of AND gates, output terminals of the plurality of AND gates are connected to control terminals of the even numbered stages, and first input terminals of the plurality of AND gates are connected to the second input line of each stage block and second input terminals of the plurality of AND gates are connected to output terminals of the odd numbered stages.

* * * * *